Aug. 2, 1955 — J. MERCIER — 2,714,392

VALVES

Filed April 8, 1952

Inventor
J. Mercier
By Glascock Downing Seebold
Attys.

United States Patent Office 2,714,392
Patented Aug. 2, 1955

2,714,392

VALVES

Jean Mercier, New York, N. Y.

Application April 8, 1952, Serial No. 281,118

4 Claims. (Cl. 137—514.7)

This invention relates to valves.

One of the objects of my invention is to ensure a good seal between the movable valve member and the valve seat by provision of means for the compensation of possible defects of alignment between the seat and the movable member.

Another object of my invention is to avoid the deformation of the circular area of said seat on which said movable member bears in the ultimate closed position by the shocks occurring during the approach of the movable valve member towards its seat.

Still another object of my invention is to reduce the vibrations of the movable valve member when the same is submitted to variable pressure conditions.

With these objects in view the valve seat is given the shape of a convex revolution surface, while the active surface of the movable valve member is given the shape of a portion of a sphere, means being provided to allow an alignment of said spherical surface in respect to said convex surface and dampen the vibrations of said movable member.

When the pressure is established, the movable valve member is urged towards its seat and, assuming a defect of alignment between its and the seat axes, comes in contact with a portion of the seat different from the portion on which it will rest in the ultimate closing position.

Due to the vibrations damping means and alignment facilities provided, the movable valve member may be displaced by the fluid pressure and is brought into its ultimate closing position, without deforming the useful sealing area of the seat. Thus, a perfect seal along a linear undeformed circular area is always established without objectionable deformations and wear of the active area of the seat.

The valve according to my invention comprises a piston slidably mounted in a bore coaxial with the convex revolution surface of the seat, said piston being mounted in said bore with a fit ensuring a dampening of the vibrations of said movable member under variable fluid pressure conditions, and means to allow for radial alignment of the spherical active surface of the movable valve member in respect to said seat.

According to one embodiment of my invention, the wall of said piston has the shape of a portion of a sphere, while the extremity of said piston facing the seat has the shape of a portion of a second sphere of a smaller diameter, so that the rotation of the piston body around the center of the first mentioned sphere allows for radial adjustments of the second mentioned sphere in respect to the convex revolution surface of the seat.

It is particularly contemplated to form the active spherical portion cooperating with the convex revolution surface on an extension of the piston proper, the wall of which has the shape of a portion of a sphere, said extension having an elongated shape in order to increase the distance between the center of the spherical portion formed by the wall of the piston and the remotest portion of the spherical active surface of the movable member, whereby the radial displacements of said active spherical portion for adjustment in respect to the seat are increased within a reasonable limit so as to permit radial adjustment of said spherical portion in respect to the seat without necessitating a play of the slidable guiding member or piston in its cylindrical bore.

According to another embodiment of my invention, the movable member is constituted by two separate parts, one having the shape of a piston slidably mounted in a bore coaxial with the seat of the valve, while the second part is constituted by a ball interposed between said seat and the extremity of the piston facing said seat, means being provided to establish a connection between said ball and said piston such that, while allowing the ball to be radially displaced in respect to the piston, said ball tends to follow the piston in its axial displacements, whereby the dampening effect due to the friction of the piston in its bore is transmitted to said ball.

It is particularly contemplated to limit the radial displacements of the ball in respect to the piston and, thus, in respect to the seat.

According to another feature of my invention, the piston is magnetized, while the ball is made of hard steel, so as to be attracted by said piston. Thus, the proper connection between piston and ball is established.

According to still another embodiment of my invention, the valve closing member is constituted by an elongated body formed on one of its ends with an active surface having the shape of a portion of a sphere adapted to cooperate with the valve seat, while the other end of said elongated body has a swivel connection with the piston which is slidably mounted in a bore coaxial with said seat, the arrangement being such that the closing member can swivel freely in respect to said piston to allow for radial adjustments in respect to the seat of the active surface of said closing member, while the vibrations of the closing member are dampened by the friction between the bore and the piston.

It is to be understood that, depending upon the operating conditions, the efficient sealing area of the valve may be rendered as small as desired by reducing the radius of curvature of the valve seat and its closure member, this radius being calculated, for instance, in a manner similar to that which allows to determine the diameter of the rolling bodies in conventional ball bearings, to thereby permit the valve of resisting the operating forces exerted thereon.

Other objects and advantages of the invention will be apparent from the following detailed description, together with the accompanying drawings, submitted for purposes of illustration only and not intended to define the scope of the invention, reference being had for that purpose to the subjoined claims. In these drawings:

Figure 1:
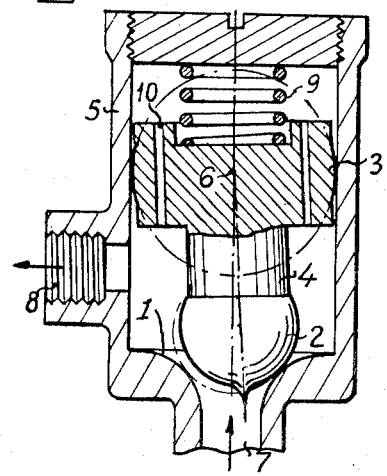
Fig. 1 is an axial sectional view of one embodiment of my invention.

Referring first to Fig. 1, there is shown a cylindrical valve casing 5 provided with a valve seat 1 having the shape of a convex revolution surface which, in the present example, is a toroidal surface, and with a movable valve closure member 2, the active surface of which has the shape of a portion of a sphere.

In the example of Fig. 1, the valve closure member 2 has a sharp pointed axial extension to facilitate the fluid flow through the valve casing when the valve member 2 is unseated. The active closing part is carried by a piston 3 the wall of which has a central portion shaped to form a portion of a sphere having a greater diameter than the spherical portion 2. The piston 3 and the closing portion 2 are connected by an elongated part 4 rigid with both of these members. The piston 3 is slidably mounted in the valve casing 5, which is coaxial with the seat 1, in such a manner that the vibrations of the movable valve member 2—3—4 are dampened by the friction between piston 3 and the inner wall of casing 5. The radial adjustment of the valve closing portion 2 in respect to the valve seat 1 is allowed by the swivel motion of piston 3 about the center 6 of its spherical wall whereby the end portions of piston 3 on either side of its spherical central portion will limit said swivel motion of the piston according to the clearance space existing between said end portions and the inner wall of casing 5.

In the example of Fig. 1, the fluid circulation to be controlled takes place between an inlet opening 7 and outlet opening 8. The valve closing member is constantly urged towards its seat by resilient means, such as a spring 9, the piston 3 being provided with passages 10 to allow fluid circulation between the two faces of the piston, so as to allow the same to be axially displaceable.

Due to the elongated shape of the part 4, small angular displacements of piston 3 determine increased radial displacements of the closing portion 2.

Figure 2:
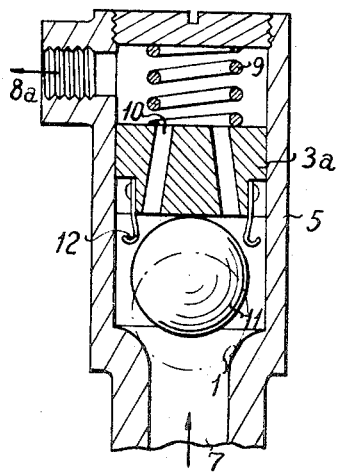
Figs. 2, 3 and 4 are similar views showing three alternative forms of another embodiment

In Fig. 2, I have shown another embodiment still comprising a seat 1 having the shape of a convex revolution surface provided in the valve casing 5 and a piston 3a slidably mounted in said casing with a fit ensuring the dampening of vibrations due to variable fluid pressure conditions.

However, in this embodiment, the movable member is constituted of two separate parts, namely the piston 3a having a cylindrical wall and a ball 11 forming the valve closing member cooperating with seat 1, said ball being interposed between said seat and said piston.

The piston 3a is magnetized and the ball 11 is made of hard steel so as to be attracted by the piston 3a. The piston is provided with tongues 12 limiting the radial displacements of the ball 11 in respect to the piston 3a.

The fluid enters the valve casing at 7, flows through the passages 10 provided in body of the piston 3a, and leaves the valve casing at 8a. A spring 9 urges the movable valve members 3a—11 towards the seat 1.

Figure 3:
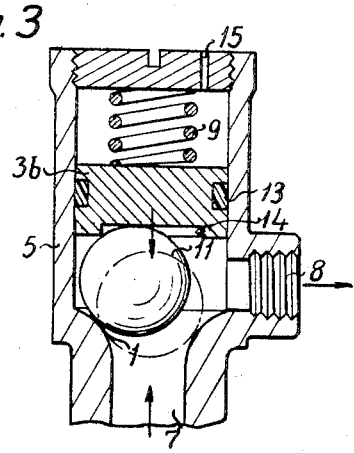

The arrangement of parts shown in Fig. 3 is similar to that of Fig. 2, except that the fluid inlet and outlet opening of the valve casing are located both on the same side of piston 3b.

In this arrangement, the space above piston 3b is opened to the atmosphere through a passage 15 and the piston is provided with a packing ring 13.

In the example of Fig. 3, the radial displacements of ball 11 in respect to the piston 3b are limited by shoulders 14 instead of the tongues 12 of Fig. 2.

Figure 4:
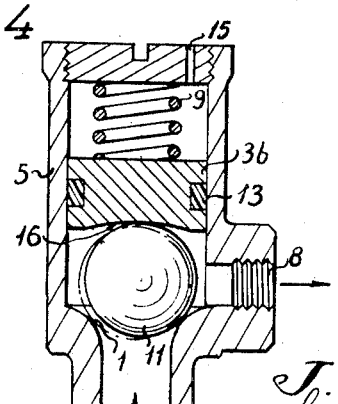

Referring now to Fig. 4, I have shown an arrangement similar to that of Fig. 3, with the difference that the means to limit the radial displacements of the ball 11 are constituted by a shallow recess 16 formed in the working face of piston 3b.

Figure 5:
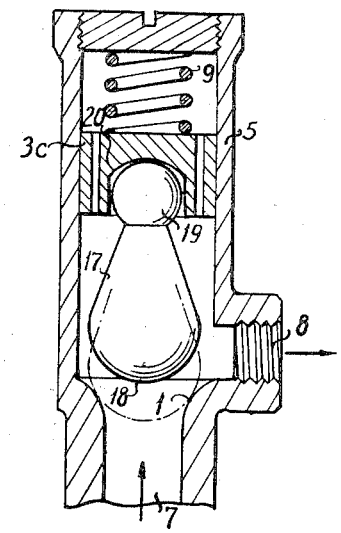
Fig. 5 shows also an axial sectional view of a third embodiment.

In Fig. 5, I have shown still another embodiment in which the movable element of the valve is constituted by a piston 3c slidably mounted in valve casing 5 coaxial with the seat 1 the valve closing member being constituted by an elongated body 17, one extremity 18 of which has the shape of a portion of a sphere while its other extremity 19, having the form of a ball, is engaeed in a recess 20 provided in the face of the piston 3c so as to form a swivel connection between the elongated body 17 and said piston 3c. The fit between the piston 3c and the casing 5 still ensures the damping of the vibrations, while the radial adjustments of the end portion 18 of the valve closing member in respect to the seat 1 are allowed by the swivel connection between said elongated body 17 and piston 3c.

While the invention has been described with particular reference to a preferred embodiment, it is not intended to limit the scope of the invention to the embodiment illustrated, nor otherwise than by the terms of the subjoined claims.

What is claimed is:

1. A valve for controlling pressure fluid circulation comprising a seat having the shape of a convex revolution surface, a casing coaxial with said seat, a member movable in said casing constituted by a piston the wall of which has the shape of a portion of a first sphere and the extremity of which, facing said seat, has the shape of a portion of a second sphere of a smaller diameter and eccentric to said first sphere, said piston being mounted in said casing with a fit ensuring frictional damping of the axial vibrations of said movable member under variable fluid pressure conditions, whereby swiveling of said movable member substantially about the center of said first spherical surface allows for radial adjustments of said second spherical surface in respect to said seat.

2. A valve according to claim 1, in which the distance between the center of said first mentioned sphere and the remotest point of said second sphere is greater than the radius of said first sphere, whereby the radial displacements for adjustment of said second sphere are increased.

3. A check valve assembly comprising a cylindrical valve casing formed with a fluid inlet port and a fluid outlet port, a valve seat constituted by a circular convex surface forming part of the inlet, a damping piston mounted to move within said casing toward and away from said valve seat, a self-centering valve closure member between said inlet port and said outlet port having a spherical shaped portion adapted to close said seat, means for connecting said piston to said closure member for longitudinal movement therewith, said connecting means spacing said spherical shaped portion from said piston being of a length at least equal to the radius of said spherical portion, and resilient means urging said piston toward said seat to thereby push said closure member into properly centered valve closing position.

4. A check valve assembly comprising a cylindrical valve casing formed with a fluid inlet port and a fluid outlet port, a valve seat formed with a circular convex surface in communication with said inlet port, a damping piston mounted to move within said casing toward and away from said seat, a self-centering valve closure member between said inlet port and said outlet port and having a spherical shaped portion adapted to close said seat, means of a length at least equal to the radius of said spherical shaped portion for interconnecting said piston and said closure member for common longitudinal movement thereof whereby self-centering transverse movement of said closure member with respect to said seat may be accomplished, means to limit said transverse movement of the closure member, and resilient means mounted to urge said piston toward said seat to thereby push said member into properly centered valve closure position.

References Cited in the file of this patent

UNITED STATES PATENTS

| | | |
|---|---|---|
| 790,056 | Hilger | May 16, 1905 |
| 909,886 | Gold | Jan. 19, 1909 |
| 1,077,795 | Bruns | Nov. 4, 1913 |
| 1,238,368 | Weber | Aug. 28, 1917 |
| 1,249,090 | Hoff | Dec. 4, 1917 |
| 1,457,544 | Myers | June 5, 1923 |
| 1,507,582 | Christmas | Sept. 9, 1924 |
| 1,558,238 | Charter | Oct. 20, 1925 |
| 1,832,341 | Williamson | Nov. 17, 1931 |
| 1,940,999 | Ferlin | Dec. 26, 1933 |
| 2,164,760 | Wesson | July 4, 1939 |

FOREIGN PATENTS

| | | |
|---|---|---|
| 16,118 | Great Britain | July 6, 1914 |